United States Patent [19]

Scherer, Jr. et al.

[11] Patent Number: 4,736,004

[45] Date of Patent: Apr. 5, 1988

[54] PERSISTENT PERFLUOROALKYL FREE RADICALS USEFUL AS POLYMERIZATION CATALYST

[75] Inventors: Kirby V. Scherer, Jr., Santa Monica; Taizo Ono, San Gabriel, both of Calif.; Kouichi Yamanouchi, Sakai, Japan

[73] Assignee: Green Cross Corporation, Japan

[21] Appl. No.: 867,645

[22] Filed: May 28, 1986

Related U.S. Application Data

[62] Division of Ser. No. 482,359, Apr. 5, 1983, Pat. No. 4,626,608.

[51] Int. Cl.$^4$ .......................... C08F 2/14; C08F 2/16; C08F 14/26; C08F 14/02
[52] U.S. Cl. ........................ 526/206; 526/89; 526/250; 526/296
[58] Field of Search ............. 526/206, 89, 250, 296

[56] References Cited

U.S. PATENT DOCUMENTS

| | | | |
|---|---|---|---|
| 3,594,358 | 7/1971 | Moberly | 260/92.8 |
| 3,694,377 | 9/1972 | Kennedy et al. | 526/206 X |
| 3,962,358 | 6/1976 | von Halasz | 260/653 |
| 4,588,796 | 5/1986 | Wheland | 526/250 X |

OTHER PUBLICATIONS

S. P. v Halasz, F. Kluge und Th. Martini–Chem. Ber 106, 2950 (1973).

Darstellung und Fluorierung von Oligomeren des Hexafluorpropens, Von Halasz et al, Chem. Ber. 106, 2950-2959 (1973).

P. J. Krusic, K. S. Chen, P. Meakin and J. K. Kochi, 2036, Journal of Physical Chem., vol. 78, No. 29, 1978.

Malatesta, D. Forrest, and K. U. Ingold, Persistent Radicals for Di-tert-butyldiazomethane and Di-tert-butylketene, vol. 82, No. 22, 1978.

William T. Miller, Jr., and Stanley D. Koch, Jr., 3084, vol. 79, The Mechanism of Fluorination; Text Oral Presentation at Washington, DC, Sep. 1, 1983.

Tumanskii et al, "Decay Kinetics of Branched Fluorine-Containing Radicals," Izvestiya Akademii Nauk SSSR, Seriya Khimicheskaya, No. 10, pp. 2222-2227, Oct. 1981 (translation, Apr. 10, 1982) relates to fluorine-containing radicals, including stable radical (IV), having an aromatic ring.

Allayarov et al, "Formation of Stable Radicals from Organofluorine Compounds", Izvestiya Akademii Nauk SSSR, Seriya Khimicheskaya No. 6, pp. 1225-1228, Jun. 1983 (Eng. Publication, Dec. 10, 1983).

Allayarov et al, "Stable Radicals-Dissolved Perfluoroalkyls", Izvestiya Akademii Nauk SSSR, Seriya Khimicheskaya, No. y, pp. 1448-1449, Jun. 1983, Eng. Trans. Dec. 20, 1983.

Allayarov et al, "Stabilization of Fluoroalkyl Radicals . . . ", Khimiya vysokikh Energii, vol. 17, No. 2, pp. 178-179, Mar.-Apr., 1983 (Eng. Trans. Sept. 1983).

*Primary Examiner*—Joseph L. Schofer
*Assistant Examiner*—F. M. Teskin
*Attorney, Agent, or Firm*—Sughrue, Mion, Zinn, Macpeak, and Seas

[57] ABSTRACT

Novel persistent perfluorinated free radicals are disclosed, which upon thermal decomposition yield free radicals which can be used to polymerize polymerizable monomers containing ethylenic unsaturation.

15 Claims, No Drawings

PERSISTENT PERFLUOROALKYL FREE RADICALS USEFUL AS POLYMERIZATION CATALYST

This is a division of application Ser. No. 482,359 filed Apr. 5, 1983 now U.S. Pat. No. 4,626,608.

FIELD OF THE INVENTION

The present invention relates primarily to perfluorinated free radicals, methods of obtaining the perfluorinated free radicals and polymerization processes employing the perfluorinated free radicals as catalysts. Other uses for the perfluorinated radicals are disclosed hereinafter.

More specifically, this invention relates to persistent (long-lived) perfluoroalkyl free radicals which are easy to make and to handle, and are useful as novel catalysts for the polymerization of ethylenically unsaturated monomers. The persistent perfluoroalkyl free radicals thermally decompose by beta-scission to yield reactive (non-persistent) free radicals which initiate polymerization.

As used herein, the term "persistent" means that the perfluoroalkyl free radicals of the present invention are characterized by an ability to remain as free radicals over an extended time period, e.g., at least one month under defined temperature conditions such as room temperature conditions. This characteristic enables the perfluoroalkyl free radicals of the invention to be successfully used as polymerization catalysts, even in batch or continuous processes which are carried out over many hours. The decomposition of the persistent free radicals disclosed herein is reversible so that they can be stored for a long time and then used to initiate polymerization. Thus, storage should not be under conditions or in the presence of materials which would prevent the reverse reaction, for example, free radical scavengers should not be present in the storage vessel.

DESCRIPTION OF THE PRIOR ART

Available sources of perfluoroalkyl radicals are in general too stable or too unstable or are difficult and expensive to prepare. For example, hexafluoroazomethane decomposes with an activation energy of 55.2 kcal/mole (Rossi and Golden, *Int. J. Chem. Kinetics*, 1979, p. 775) and trifluoromethyl iodide with an activation energy of 52.6 kcal/mole (Okafo and Whittle, *Int. J. Chem. Kinetics*, 1975, p. 287); the latter requires a temperature of about 200° C. to initiate free radical chain addition to olefins (W. A. Sheppard and C. M. Sharts, "Organic Fluorine Chemistry," W. A. Benjamin, Inc., 1969, p. 189; these authors also describe the preparation of these compounds.)

Perfluoroacyl peroxides are described in a paper by Gumprecht and Dettre, *J. Fluorine Chem.*, 1975, p. 245; perfluoroacetyl peroxide could be prepared in only 20% yield, and is apparently very unstable to hydrolysis. In a more recent paper, Chengxue, et al., *J. Org. Chem.*, 1982 p. 2009, report details of the preparation and decomposition kinetics of several polyfluorinated diacyl peroxides.

The lack of good precursors for perfluoroalkyl radicals makes it necessary to use non-fluorinated initiators such as persulfate for the polymerization of tetrafluoroethylene and its co-monomers, and the consequent introduction of reactive end-groups into the polymer may be detrimental to its properties or compel additional steps and expense to alter the end-groups. See. D. I. McCane, *Encyclopedia of Polymer Science and Technology*, Vol. 13, pp. 623–670.

Von Halasz and his co-workers describe perfluorination of a mixture of F-2,4-dimethyl-3-ethylpent-2-ene (hereinafter abbreviated as "Trimer A") and F-3-isopropyl-4-methylpent-2-ene (hereinafter abbreviated as "Trimer B") to obtain their perfluorinated compounds [S. P. von Halasz, F. Kluge and T. Martini, *Chem. Ber.*, 106, 2950–2959 (1973)]. In this literature, von Halasz et al mention free radicals as intermediates to rationalize their products, but without any supporting data for the radicals. The proposed intramolecular 1,2-trifluoromethyl shift is without precedent in ground-state free radicals. The partial reaction sequence of von Halasz et al is

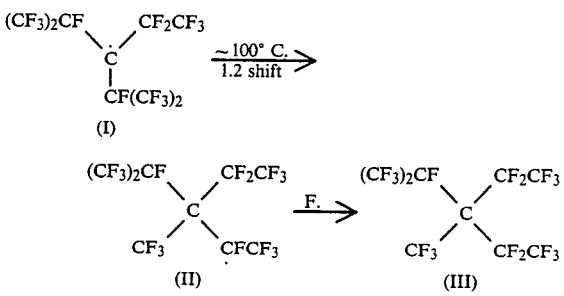

Trimer A and B are of the following structures, respectively:

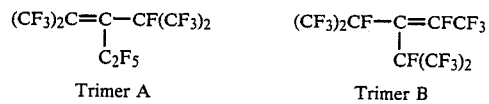

SUMMARY OF THE INVENTION

Therefore, an object of the present invention is to provide persistent perfluoroalkyl free radicals.

Another object of the present invention is to provide processes for producing the aforementioned persistent perfluoroalkyl free radicals.

A further object of the present invention is to provide free radical-catalyzed polymerization processes wherein the perfluoroalkyl radicals of the present invention are utilized as catalytic materials.

A more specific object of the present invention is to provide improved aqueous, especially of the emulsion type, and non-aqueous polymerization systems for polymerizing ethylenically unsaturated monomers, particularly the polymerization of halogenated monomers such as ethylenically-unsaturated monomers in which all hydrogen atoms have been replaced by halogen atoms.

Another specific object of the present invention is to provide improved non-aqueous free radical polymerization systems for polymerizing fluorinated monomers, particularly fluorinated monomers in which all hydrogen atoms have been replaced by fluorine atoms.

Other objects of the present invention will be apparent to the skilled artisan from the detailed description of the invention hereinafter.

Therefore, in accordance with the present invention there is provided persistent perfluoroalkyl tertiary free radicals having at least 8 carbon atoms including at least one secondary or tertiary perfluorinated alkyl group attached directly to the central tri-valent carbon. Preferably, the present invention provides compounds of the structure (Z)

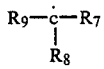

wherein each of $R_7$, $R_8$ and $R_9$ is a perfluorinated alkyl group, with at least one of $R_7$, $R_8$ and $R_9$ being a secondary or tertiary group and the total carbon atoms present in the free radical (Z) being from 8 to 12. In a preferred aspect, one of $R_7$, $R_8$ and $R_9$ are secondary, more preferably tertiary, perfluorinated alkyl groups.

At this time, a more specific embodiment of the present invention provides persistent perfluoroalkyl free radicals of the generic formula (VII)

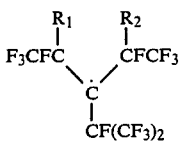

wherein $R_1$ and $R_2$ each independently represents a fluorine atom, a trifluoromethyl group ($CF_3-$) or a pentafluoroethyl group ($CF_3CF_2-$), which free radicals have a total carbon number of 8 to 12.

DETAILED DESCRIPTION OF THE INVENTION

In accordance with a specific embodiment of the present invention, it has been found that the trimers of perfluoropropene, a mixture of F-2,4-dimethyl-3-ethylpent-2-ene (hereinafter abbreviated as "Trimer A") and F-3-isopropyl-4-methylpent-2-ene (hereinafter abbreviated as "Trimer B"), undergo fluorination with undiluted fluorine to yield an unusually stable free radical as a first intermediate, which in turn releases trifluoromethyl radicals upon heating. This first free radical can be used per se as a polymerization catalyst, or can be used to form second and third perfluoroalkyl free radicals, as disclosed hereinafter, which second and third perfluoroalkyl free radicals can be used alone or in combination with the first free radical as a polymerization catalyst.

More particularly, in accordance with the present invention, in one embodiment thereof, it has been found that a persistent free radical of the formula (I), perfluorodiisopropylethylmethyl radical

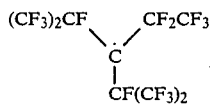

can be generated by fluorinating a mixture of Trimer A and Trimer B or either pure isomer at a temperature of from about 0° C. to about 45° C. Preferred reaction conditions are believed to be about 30° C. to about 40° C. and the preferred method is fluorination of pure Trimer B at 30° C. to 40° C.

In another embodiment of the present invention, perfluorodiisopropylethylmethyl radical of the formula (I) is heated at a temperature of about 100° C. in the presence of Trimer B to provide perfluorotriisopropylmethyl radical of the formula (IV)

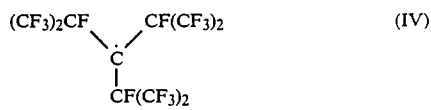

plus a new alkene, F 3-ethyl-4-methyl-2-pentene of the formula (V) as a mixture of E and Z isomers. Further addition of fluorine to the product mixture or to the pure alkene (V), preferably at 30° to 40° C. forms the perfluorodiethylisopropylmethyl radical of the formula (VI)

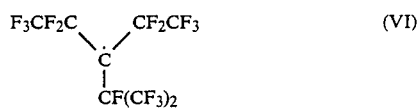

In accordance with other embodiments of the present invention, a catalyst comprising at least one of the persistent perfluoroalkyl free radicals of the present invention, for example of the formula (Z), preferably of the formula (VII), is used to generate by the process of beta-scission, reactive perfluoroalkyl radicals which in turn initiate polymerization of ethylenically unsaturated monomers in either aqueous or non-aqueous systems. Preferably, halogenated, ethylenically unsaturated monomers, such as tetrafluoroethylene, chlorofluoroethylenes and the like are polymerized in aqueous, non-aqueous or gaseous diluents in the presence of a catalytic amount of at least one of the perfluoroalkyl radicals of the formula (Z), preferably of the formula (VII).

The present inventors have extensively investigated the intermediate radicals which yield the unusual product of the formula (III), disclosed above, of von Halasz et al. The proposed intramolecular rearrangement (1.2-$CF_3$ shift) for a free radical would be without precedent in a non-cyclic system. A 1.2-$CF_3$ shift in a carbonium ion would not be surprising, but it is difficult to rationalize the carbonium ion forming at 100° C., but not at 50° C. Morever, in an attempt to force the fluorination reaction (i.e., the reaction of Trimers A and B to the compound of the formula (III) at a temperature of 0° to 50° C. in the presence of undiluted fluorine) into an ionic pathway by adding a catalytic amount of $SbF_5$, the present inventors found no change in the product (i.e., compound of the formula (III)) when the reaction was carried out at room temperature.

The inventors' investigations have led to the surprising discovery that the intermediate free radicals which have the formula

wherein each of $R_7$, $R_8$ and $R_9$ is a perfluorinated alkyl group, with at least one of $R_7$, $R_8$ and $R_9$ being a secondary or tertiary group and the total carbon atoms present in the radical being from 8 to 12, is characterized by an unusally long life, believed to be over several years when stored at room temperature. The radicals of the present invention include the radicals of formulae (I), (IV), and (VI). Thus, an intermediate expression of the radicals of the present invention would be that of the formula (VII),

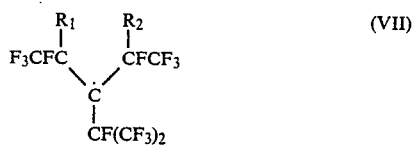

wherein $R_1$ and $R_2$ each independently represents a fluorine atom, a trifluoromethyl group or a pentafluoroethyl group, which free radicals have a total carbon number of 8 to 12.

The ESR spectrum of the radical obtained by the direct fluorination of a mixture of Trimers A and B with undiluted fluorine at 0° to 45° C. shows a doublet with a principal splitting of 46 gauss due to one unique beta-fluorine, and additional smaller splittings due to the other fluorines in the molecule. This pattern, though not yet completely analyzed, appears consistent with the assigned structure (I), in which the fluorines beta to the radical center are rendered non-equivalent by restricted rotation in the sterically hindered molecule. (V. Maletesta et al, *Phys. Chem.*, 82, 2370 (1978)). Then, the spectrum of the second radical (IV), obtained by heating (I) with excess Trimer B to 100° C. for several hours, shows a symmetrical multiplet resulting from splittings of 0.25 gauss by three equivalent beta fluorines, and 2.7 gauss by eighteen equivalent gamma fluorines, which is consistent with the assigned structure (IV) resulting from intermolecular transfer of a trifluoromethyl radical.

The persistent perfluoroalkyl free radicals of this invention can be prepared by a conventional method. Thus, a mixture of Trimer A and B or either of them in pure form is fluorinated with undiluted fluorine or fluorine diluted with an unreactive gas such as nitrogen or argon in a batch process at 0° to about 45° C. to yield a radical of the above formula (I)

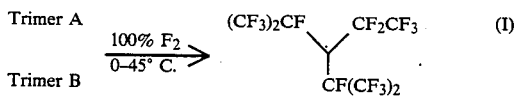

An excess of Trimer B over that required to produce the free radical of the formula (I) is often preferred so that the reaction product, with or without separation from perfluorinated compounds can be used for the production of the perfluoroalkyl radical of the formula (IV), without addition of Trimer B.

Upon heating to above about 100° C., usually about 100° to 110° C., radical (I) reacts with Trimer B to yield radical (IV). Trimer B should be present in an amount so that the initial molar ratio of Trimer B: radical (I) is about 9:1 to 1:9. Although this embodiment of the present invention is not limited by a particular reaction theory, it is believed that, upon heating, radical (I) yields the reactive trifluoromethyl radical plus the F-alkene of the formula (V)

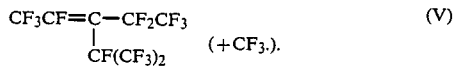

The alkene of the formula (V) reacts with fluorine to yield the radical of the formula (VI) which in turn reacts with a trifluoromethyl radical to yield the von Halasz compound of the formula (III).

The trifluoromethyl radical also reacts with Trimer B to yield the radical of the formula (IV). It is believed that radical (IV) is so hindered that it does not react appreciably even with fluorine, but builds up during the early stages of the fluorination at 100° C., i.e., under the conditions of von Halasz et al, and subsequently decomposes to regenerate the trifluoromethyl radicals which combine with radical (VI) to give compound (III).

Dimerization reactions of the free radicals of the general formulae (Z) and (VII), or combinations of the radicals with the growing end of polymer chains, a type of termination process known to limit free radical polymerization, are unlikely to occur due to steric hindrance. On the other hand, the trifluoromethyl radicals will eventually combine irreversibly to provide $C_2F_6$, but that process will be very slow because the instantaneous concentration of trifluoromethyl radicals in equilibrium with the free radicals such as (I) and (IV) can be made as low as desired by reducing the temperature below 100° C.

The free radical content of the reaction products can be determined by means of NMR spectrometry [D. F. Evans, *J. Chem. Soc.*, 1959, 2003.]. The present radicals are distillable under reduced pressure, such that the distillation is carried out below about 50° C., or can be separated and analyzed by gas chromatography at temperatures up to about 100° C., since the latter process is more rapid. Thus, the radical (I) can be separated from mixtures containing perfluorination products, radicals (IV) and (VI), and their decomposition products.

The radicals of the present invention, including the free radicals of the general formulae (Z) and (VII), are safe to handle and are soluble in inert solvents such as chlorofluorocarbons and perfluorocarbons. Preferred solvents are Freon-type solvents such as $CF_3CFCl_2$. The radicals of the general formulae (Z) and (VII) should decompose at above about 80° C. and can be employed in polymerization methods carried out in aqueous or non-aqueous media. The free radical catalysts are sufficiently active to be effective over a wide range of temperature conditions varying from room temperature up to about 300° C. The free radical catalysts may be employed in bulk polymerizations, in which the monomer(s) is liquid or may be employed in the polymerization of gaseous monomer(s) at pressures ranging from atmospheric pressure up to pressures above 3,000 atmospheres, in the presence of and under the presssure of inert solvents. The catalyst is particularly useful in the polymerization of fluorinated monomers such as tetrafluoroethylene, chlorotrifluoroethylene and hexafluoropropylene, as well as in the polymerization of these monomers with ethylenically unsaturated monomers copolymerizable therewith. As stated hereinabove, the catalysts of the present invention are employed in either aqueous or non-aqueous systems. Particularly suitable reaction media for polymerization with the novel catalysts of the present invention are perfluorinated hydrocarbon solvents and other fluorinated solvents inert toward the monomer and catalyst. In addition, the inert solvents disclosed hereinabove which can be used to solubilize the free radical catalysts of the present invention, can be used as reaction media if inert toward the monomer. In addition, particularly where liquid monomers are being employed, the monomers themselves can be used to solubilize the catalysts and to prepare catalyst preparations which can be added to additional quantities of the monomer(s) for polymerization.

The free radicals of this invention may also be used as good oxygen solvents, for example as potential air-separation tools or as calibration standards for electron spin resonance spectrometers.

In greater detail, the catalysts of the present invention can be employed to catalyze the polymerization of one or more ethylenically unsaturated monomers in aqueous or non-aqueous reaction media. As examples of monomers usable in the present invention, there may be mentioned tetrafluoroethylene, trifluoroethylene, vinylidene fluoride, vinyl fluoride, hexafluoropropene, chlorotrifluoroethylene, 3,3,3-trifluoropropene, and perfluoroalkoxytrifluoroethylenes.

As discussed above, the preferred monomers for polymerization are halogenated olefins containing 2 or 3 carbon atoms and up to 6 halogen atoms. These halogenated olefins can be copolymerized with one or more monomers copolymerizable therewith, such as other halogenated and non-halogenated ethylenically unsaturated monomers disclosed herein, such as ethylene, propylene, butene, acrylic acid, methacrylic acid and the like.

A catalytically effective amount of the free radical of the invention such as of the formulae (Z) or (VII) is employed in the polymerization embodiments of the invention. In general, the catalysts of this invention are employed in an amount of about 0.01% to about 2.0% based on parts by weight.

The polymerization of the present invention can be carried out using conventional batch, continuous, multi-step and the like techniques. For example, batch procedures utilizing closed vessel systems, or continuous procedures using heated tubes through which gaseous reactants flow, two step batch polymerizations, batch prepolymerization followed by continuous polymerization to completion, and the like, can be used, as known to the skilled artisan. Polymerization time can vary widely, but will usually be within about 10 minutes to 8 hours. Conventional measurement techniques, such as intrinsic viscosity measurement, etc. can be employed to monitor the course of polymerization. Polymerization can be terminated by stopping the supply of monomer or by cooling the reaction mixture below about 50° C. Conventional polymer work-up procedures will be employed to recover and purify the polymeric products obtained.

EXAMPLE 1

A mixture of 20 g of Trimer A and Trimer B (molar ratio A:B=1.7:1) was placed in a 50 ml Teflon reaction chamber, flushed with nitrogen at the feed rate of around 5 ml/min for 20 min, and then fluorinated at a temperature of 25° C. by bubbling undiluted fluorine, at a feed rate of about 10 ml/min, through the mixture by means of a tube reaching down to the bottom of the liquid trimers. The radical content was measured by the Evans method, and found to reach a maximum, corresponding to about 35% by weight of contained (I), after six hours.

In another run, the same reaction was carried out at 0° C.; in this case the same maximum radical concentration was reached after 18 hours. In either case, the radical concentration decreased if the fluorination was continued beyond the time specified.

Analysis of the radical solutions prepared in the above manner by electron spin resonance spectroscopy showed the presence of only the radical of structure (I).

Analysis of the reaction mixture by means of gas chromatography showed that Trimer B was entirely consumed at the point where the maximum radical concentration was reached, so Trimer B reacts more rapidly than Trimer A with fluorine. Other experiments showed that the radical (I) is formed from both trimers, but more efficiently from Trimer B.

EXAMPLE 2

A clean Pyrex tube, 8 mm in diameter, was sealed at one end and charged with approximately 1.0 g of freshly distilled styrene monomer and 10 mg of the solution of (I) prepared as in Example 1 above. The tube was then degassed and sealed under vacuum, and heated to 80° C. for 6 hours. At the end of this time the tube was found to be filled with solid polymer. Control experiments showed no polymerization in the absence of the radical (I). In another run, a similar result was obtained with acrylonitrile monomer.

EXAMPLE 3

Preparation of radical (IV): One microliter of the solution of radical (I), prepared as in Example 1, was combined with about 0.4 ml of the mixture of Trimers A and B and 0.6 ml of F-isohexane, and the solution degassed and sealed under vacuum in a 4 mm quartz tube, which was then heated for four hours at 100° C. The tube was then cooled to room temperature and analyzed by EPR spectroscopy. Only radical (IV) was detected, at a concentration approximately equal to the initial concentration of radical (I). [The great dilution is for the purpose of observing the EPR spectrum under the best condition, and is not a limitation on the conversion of radical (I) to radical (IV).]

Radical (I) has been isolated in pure form by gas chromatography, using a Fomblin perfluoropolyether stationary phase at a temperature of about 60° C. An alternate method of isolation of the free radicals of the invention would be by spinning-band distillation at reduced pressure.

Although the free radicals are of primary usefulness in the polymerization of fluorinated monomers, they may also be employed in the polymerization of unfluorinated ethylenically unsaturated monomers. Polymerization procedures which do or do not require an aqueous medium and allow reaction temperaatures above room temperature may be employed with the radicals of the present invention. The perfluoroalkyl radicals of the present invention to be "persistent" must be sufficiently sterically hindered to prevent their dimerizing at the temperature of use; on the other hand, they must not be so crowded that they fall apart spontaneously as fast as they are formed.

Variations of the invention will be apparent to the skilled artisan.

What is claimed is:

1. In a process for free radical-catalyzed polymerization of a monomer containing ethylenic unsaturation in an aqueous, a non-aqueous or a gaseous medium, the improvement which comprises catalyzing said polymerization with a catalytically effective amount of a persistent perfluoroalkyl tertiary free radical having 8 to 12 carbon atoms and at least one secondary or tertiary perfluorinated alkyl group attached directly to the central tri-valent carbon.

2. The process of claim 1 using a free radical having the general formula $$R_9-\overset{\cdot}{\underset{R_8}{C}}-R_7 \quad (Z)$$

wherein each of $R_7$, $R_8$ and $R_9$ is a perfluorinated alkyl group, with at least one of $R_7$, $R_8$ and $R_9$ being a being a secondary or tertiary group and the total carbon atoms present in the radical being from 8 to 12.

3. The process of claim 2 wherein at least two of $R_7$, $R_8$ and $R_9$ are secondary perfluorinated alkyl groups.

4. The process of claim 2 wherein at least two of $R_7$, $R_8$ and $R_9$ are tertiary perfluorinated alkyl groups.

5. The process of claim 1 using a free radical of the general formula (VII)

$$F_3CFC\underset{\underset{CF(CF_3)_2}{|}}{\overset{R_1}{\diagdown}}\overset{R_2}{\underset{C}{\diagup}}CFCF_3 \quad (VII)$$

wherein $R_1$ and $R_2$ each independently represent a fluorine atom, a trifluoromethyl group or a trifluoroethyl group, with the free radical having a total carbon number of 8 to 12.

6. The process of claim 5 wherein the free radical has 8 to 10 carbon atoms.

7. The process of claim 1 using a free radical having the formula $$(CF_3)_2CF\underset{\underset{CF(CF_3)_2}{|}}{\overset{\diagdown}{C}}\overset{\diagup}{}CF_2CF_3$$

8. The process of claim 1 using a free radical having the formula $$(CF_3)_2CF\underset{\underset{CF(CF_3)_2}{|}}{\overset{\diagdown}{C}}\overset{\diagup}{}CF(CF_3)_2$$

9. The process of claim 1 using a free radical having the formula $$F_3CFC\underset{\underset{CF(CF_3)_2}{|}}{\overset{\diagdown}{C}}\overset{\diagup}{}CFCF_3$$

10. The process of claim 1 wherein said polymerization is carried out at a temperature of from about room temperature up to about 300° C. under a pressure of about atmospheric pressure up to about 3,000 atmospheres.

11. The process of claim 1 wherein 0.01% to 2.0% of the free radical is used as a catalyst.

12. The process of claim 1 wherein said monomer is an olefin.

13. The process of claim 1 wherein the monomer is a halogenated olefin.

14. The process of claim 13 wherein the monomer is perhalogenated.

15. The process of claim 14 wherein the halogen atoms are selected from the group consisting of chlorine and fluorine atoms.

* * * * *